United States Patent Office 2,695,875
Patented Nov. 30, 1954

2,695,875

PURIFICATION OF HYDROCHLORIC ACID SOLUTIONS

Francis X. McGarvey, Haddon Heights, N. J., assignor to Rohm & Haas Company, Philadelphia, Pa., a corporation of Delaware No Drawing. Application October 5, 1951, Serial No. 250,040

2 Claims. (Cl. 210—24)

This invention relates to the purification of hydrochloric acid. More particularly it relates to a process of removing dissolved iron impurities from relatively concentrated hydrochloric acid by means of ion-exchange resins.

The process is a cyclic one and it comprises treating a hydrochloric acid solution which has a molar concentration of at least six and which contains dissolved iron with an insoluble, strongly basic anion-exchange resin of which the polar, ion-adsorbing groups are quaternary ammonium chloride groups, then separating the resin and the acid solution and finally regenerating the resin by washing it with water in an amount equal to at least ninety per cent of the volume of the resin.

The process can be carried out by merely agitating a mixture of resin and the hydrochloric acid and thereafter separating the two mechanically by such methods as decantation and filtration. It is much preferred, however, to pass the contaminated acid solution through a bed or column of particles of the resin until the resin has adsorbed its capacity of the iron impurities; i. e., until the resin has become exhausted. In either case the resin, after being separated from the purified acid solution, is then freed of the adsorbed iron impurities by washing with water. The resin is thus regenerated and is in condition for re-use while the iron impurities are flushed from the resin and are obtained in the form of a highly concentrated solution from which iron can be readily recovered.

In this process the concentration of the hydrochloric acid solution is critical and it must be at least six molar. Iron is not removed efficiently or at all from solutions which are more dilute.

The iron which is removed is in the ferric state of valence. Any ferrous iron which is to be removed is oxidized to the ferric state before the acid solution is treated with the resin.

The anion-exchange resins which are employed are those which are of the strongly basic type by virtue of the presence in the molecular structure of the resins of polar quarternary ammonium groups. For purposes of this invention the polar groups are quaternary ammonium chloride groups. It is preferred to start the process with a resin which is in the chloride form; but it is also to be noted that a resin in any other form, such as the hydroxyl form or the sulfate form, can be used since it is immediately converted to the chloride form when brought into contact with the hydrochloric acid, and remains in the chloride form during the period of adsorption and after regeneration with water.

Suitable quaternary ammonium anion-exchange resins include those which are described in C. H. McBurney's application for Letters Patent, Serial No. 759,308, filed July 5, 1947, now Patent No. 2,591,573. Such resins are insoluble, cross-linked copolymers of a monovinyl hydrocarbon, preferably styrene, and a polyvinyl hydrocarbon, preferably divinylbenzene, to the aromatic nuclei of which are attached through methylene groups the polar quaternary ammonium groups. Typical of such resins are those made by chloromethylating an insoluble copolymer of about 92–99.5% styrene and 0.5–8% divinylbenzene and then reacting the chloromethylated copolymer with a tertiary amine such as trimethylamine, dimethylaminoethanol, dimethylbenzylamine, dimethylaniline, dibenzylmethylamine and the like.

Another type of suitable quaternary ammonium anion-exchange resin is described in U. S. Patent No. 2,567,836 of September 11, 1951. This particular kind of resin is made by reacting an acrylamido compound with an alkylene dihalide whereby the amino groups in the acrylamido compound are quaternized.

Still another suitable type is that described in J. C. Hwa's application for Letters Patent, Serial No. 250,037, filed October 5, 1951, now U. S. Patent 2,630,427. This type is made by reacting in an aqueous medium a tertiary amine, such as those described above, with a cross-linked, insoluble polymer of a glycidyl ester of acrylic acid or of an alpha-substituted acrylic acid in which the alpha-substituents are a chlorine atom or a lower alkyl group.

All of the operable resins, regardless of the process of their manufacture are insoluble and contain, as their polar, ion-adsorbing groups, quaternary ammonium groups attached to a cross-linked, insoluble polymer.

The exhausted resin is regenerated by washing it with water. It is essential that sufficient water be used, and the minimum volume of water must be at least 90% of the volume of the resin which is being regenerated. Larger volumes are recommended of the order of two to ten times the volume of the resin. The resin is, of course, completely regenerated when the last bit of wash water fails to show a test for iron.

The following example serves to illustrate this invention:

A glass cylinder was filled with 4130 cubic centimeters of the particles of a commercially available anion-exchange resin. This resin was made by first copolymerizing in suspension a mixture of 96% styrene and 4% of divinylbenzene, chloromethylating the insoluble copolymer, then reacting the intermediate, chloromethylated resin with dimethylaminoethanol, $(CH_3)_2N$—$C_2H_4$—$OH$, and finally washing the product with an excess of dilute hydrochloric acid. As a result of the method of its manufacture, the resin contained as its polar, anion-exchanging groups and quaternary ammonium groups of the formula

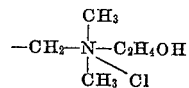

attached to the aromatic nuclei of the macromolecules.

Through this column were passed three carboys of concentrated hydrochloric acid (32%) containing 0.0022% of dissolved iron and having a color, on the ApHA scale, of over 200. After passage through the column the acid had an iron-content of only 0.00005% iron and an ApHA color of 25. Thus the acid was substantially freed of iron. The rate of flow, within reasonable limits, did not affect the quality of the effluent and a flow-rate of at least one gallon per minute per cubic foot of resin was practical.

Although the treatment of three carboys of acid did not exhaust the resin, the latter was regenerated by passage through it of eight liters of water. This amount of water measured a little less than twice the volume of the column of resin, but was sufficient to remove over 99% of the adsorbed iron as evidenced by analysis of the wash-water.

I claim:

1. A cyclic process for the removal of dissolved ferric iron impurities from hydrochloric acid having a concentration of at least six molar which comprises treating said hydrochloric acid containing said iron impurities with an anion-exchange resin containing quaternary ammonium chloride groups as its polar groups, separating said resin and said hydrochloric acid and regenerating said resin by washing it with a volume of water equal to at least 90% of the volume of said resin.

2. A cyclic process for the removal of dissolved ferric iron impurities from hydrochloric acid having a concentration of at least six molar which comprises treating said hydrochloric acid containing said iron impurities with an anion-exchange resin containing quaternary ammonium chloride groups as its polar groups, separating said resin and said hydrochloric acid and regenerating said resin by washing it with a volume of water equal to two to ten times the volume of said resin.

(References on following page)

References Cited in the file of this patent

UNITED STATES PATENTS

| Number | Name | Date |
|---|---|---|
| 2,104,501 | Adams et al. | Jan. 4, 1938 |
| 2,105,700 | Ramage | Jan. 18, 1938 |
| 2,258,216 | Ramage | Oct. 7, 1941 |
| 2,567,836 | Anthes | Sept. 11, 1951 |

OTHER REFERENCES

Industrial and Engineering Chemistry, vol. 35, No. 8, Aug. 1943, pp. 859–863.

Industrial and Engineering Chemistry, vol. 37, No. 7, July 1945, pp. 618–624.